(12) United States Patent
MacNeille et al.

(10) Patent No.: US 9,709,410 B2
(45) Date of Patent: Jul. 18, 2017

(54) METHOD AND APPARATUS FOR VEHICLE-BASED DATA GATHERING

(75) Inventors: Perry Robinson MacNeille, Lathrup Village, MI (US); Oleg Yurievitch Gusikhin, West Bloomfield, MI (US); Yimin Liu, Ann Arbor, MI (US); Mark Schunder, South Lyon, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 979 days.

(21) Appl. No.: 13/405,439

(22) Filed: Feb. 27, 2012

(65) Prior Publication Data
US 2013/0226731 A1 Aug. 29, 2013

(51) Int. Cl.
| | |
|---|---|
| G06Q 30/00 | (2012.01) |
| G01C 21/34 | (2006.01) |
| G06Q 30/06 | (2012.01) |
| G06Q 10/00 | (2012.01) |
| G06Q 50/00 | (2012.01) |
| H04W 4/02 | (2009.01) |
| G01C 21/36 | (2006.01) |

(52) U.S. Cl.
CPC ..... *G01C 21/3415* (2013.01); *G01C 21/3476* (2013.01); *G01C 21/3679* (2013.01); *G06Q 10/00* (2013.01); *G06Q 30/00* (2013.01); *G06Q 30/0631* (2013.01); *G06Q 30/0633* (2013.01); *G06Q 30/0639* (2013.01); *G06Q 50/00* (2013.01); *H04W 4/02* (2013.01)

(58) Field of Classification Search
CPC .......................... G06Q 30/00; G06Q 30/0631
USPC ................................................... 705/26, 27
See application file for complete search history.

(56) References Cited

U.S. PATENT DOCUMENTS

| | | | |
|---|---|---|---|
| 5,963,948 A | 10/1999 | Shilcrat | |
| 6,504,571 B1 | 1/2003 | Narayanaswami et al. | |
| 7,610,560 B2 | 10/2009 | Horvitz et al. | |
| 7,792,703 B1 * | 9/2010 | Amidon et al. | 705/26.1 |
| 7,925,547 B2 | 4/2011 | Schirmacher et al. | |
| 8,090,622 B2 | 1/2012 | Mital | |
| 8,260,666 B2 | 9/2012 | Kalaboukis et al. | |
| 8,571,941 B2 | 10/2013 | Perrier et al. | |
| 8,612,312 B1 * | 12/2013 | Edwards et al. | 705/26.8 |
| 2002/0174021 A1 * | 11/2002 | Chu | G06Q 10/063 705/7.11 |
| 2003/0093217 A1 * | 5/2003 | Petzold et al. | 701/201 |

(Continued)

OTHER PUBLICATIONS

Vann, Korky: "Appy Holidays: Use of Smartphone to help find deals, challenge prices, keep on budget," Hartford Courant, Nov. 28, 2010, ProQuest Dialog #815390179, 4pgs.*
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).

(Continued)

*Primary Examiner* — Rob Pond
(74) *Attorney, Agent, or Firm* — Jennifer Stec; Brooks Kushman P.C.

(57) ABSTRACT

A computer implemented method includes accessing a list containing one or more items for purchase. The method further includes receiving a vehicle location. The method also includes searching for one or more stores within a predefined distance of the vehicle location, which sell at least one item from the list, and the prices those stores offer. Additionally, the method includes recommending a stop at at least one of the one or more stores, and providing directions to a store for which a stop was recommended.

4 Claims, 4 Drawing Sheets

(56) References Cited

U.S. PATENT DOCUMENTS

| | | | |
|---|---|---|---|
| 2003/0195694 A1* | 10/2003 | Kozak et al. | 701/200 |
| 2005/0197767 A1 | 9/2005 | Nortrup | |
| 2007/0150369 A1* | 6/2007 | Zivin | 705/26 |
| 2010/0114734 A1* | 5/2010 | Giuli et al. | 705/26 |
| 2010/0153008 A1 | 6/2010 | Schwartz et al. | |
| 2011/0257878 A1* | 10/2011 | Felten | G06Q 10/06 701/533 |
| 2012/0239523 A1* | 9/2012 | Ouimet | G06Q 30/00 705/26.7 |
| 2012/0253908 A1* | 10/2012 | Ouimet | G06Q 30/06 705/14.23 |
| 2013/0218463 A1 | 8/2013 | Howard et al. | |
| 2013/0218912 A1 | 8/2013 | Howard et al. | |
| 2013/0295913 A1 | 11/2013 | Matthews, III et al. | |
| 2014/0067564 A1 | 3/2014 | Yuan | |

OTHER PUBLICATIONS

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

METHOD AND APPARATUS FOR VEHICLE-BASED DATA GATHERING

TECHNICAL FIELD

The illustrative embodiments generally relate to a method and apparatus for vehicle based data gathering.

BACKGROUND

Vehicle infotainment systems are constantly advancing and have come a long way since the simple radios, tape and CD players that provided relatively pre-determined content. Modern infotainment systems can stream music from the internet, provide turn-by-turn directions, communicate with remote servers, run applications and play music from a wireless device, and generally bring many features of an actual PC into the vehicle.

Music, for example, can be had over the radio, CD player, from an MP3 player, from a wireless device, or even streamed from the internet. Using, for example, a connection to the internet established through a portable wireless device, a user can access applications such as PANDORA, which sends music tailored to a users liking from a remote source to a vehicle sound system.

Turn-by-turn navigation is also possible, even if a vehicle does not have an on-board GPS system. A portable device, such as a smart phone, can provide a GPS signal, and navigation can be obtained from a remote server or even from the smart phone. The navigation can be output through the vehicle's audio system, giving a user the experience of having on-board navigation at a fraction of the price.

Even vehicle systems, such as, for example, powertrain systems, can be optimized through a remote connection. Vehicle and road data can be streamed to a remote cloud-based server, which can perform optimization calculations and deliver recommended implementation strategy for powertrain control. Other vehicle modules capable of optimization can also be controlled on some level through communication with a remote server.

Even with all the modern tweaks, upgrades and advantages of current vehicle infotainment systems, however, there remains a great deal of additional functionality that can be added to a vehicle. With the goal of making the driving experience as easy, seamless and enjoyable as possible, numerous potential improvements can still be made.

SUMMARY

In a first illustrative embodiment, a computer implemented method includes accessing a list containing one or more items for occupants to purchase. The illustrative method further includes receiving a vehicle location. The illustrative method also includes searching for one or more stores within a predefined distance of the vehicle location, which sell at least one item from the list. Additionally, the method includes recommending a stop at at least one of the one or more stores, and providing directions to a store for which a stop was recommended.

In a second illustrative embodiment, a computer implemented method includes receiving a desired end-time for a route. The illustrative method also includes comparing a current time and estimated time of arrival to a desired end time once a vehicle is within a predetermined distance of a route end. Further, the illustrative method includes searching the proximity of the vehicle, once the vehicle is within the predetermined distance of the route end, for at least one store selling at least one item from a shopping list. Additionally, the method includes estimating the amount of time to travel to the at least one store, and recommending a detour to the at least one store, based at least in part on an amount of time to travel to the at least one store and subsequently travel to the route end being less than a total amount of time remaining before the desired end-time.

In a third illustrative embodiment, a computer implemented method includes accessing a shopping list. The method also includes receiving a vehicle location and receiving one or more trip parameters. Further, the method includes searching for stores selling at least one item from the shopping list reachable by a trip conforming to the one or more trip parameters. The method additionally includes recommending at least one trip, including at least one store selling at least one item from the shopping list, wherein the trip conforms to the one or more trip parameters.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
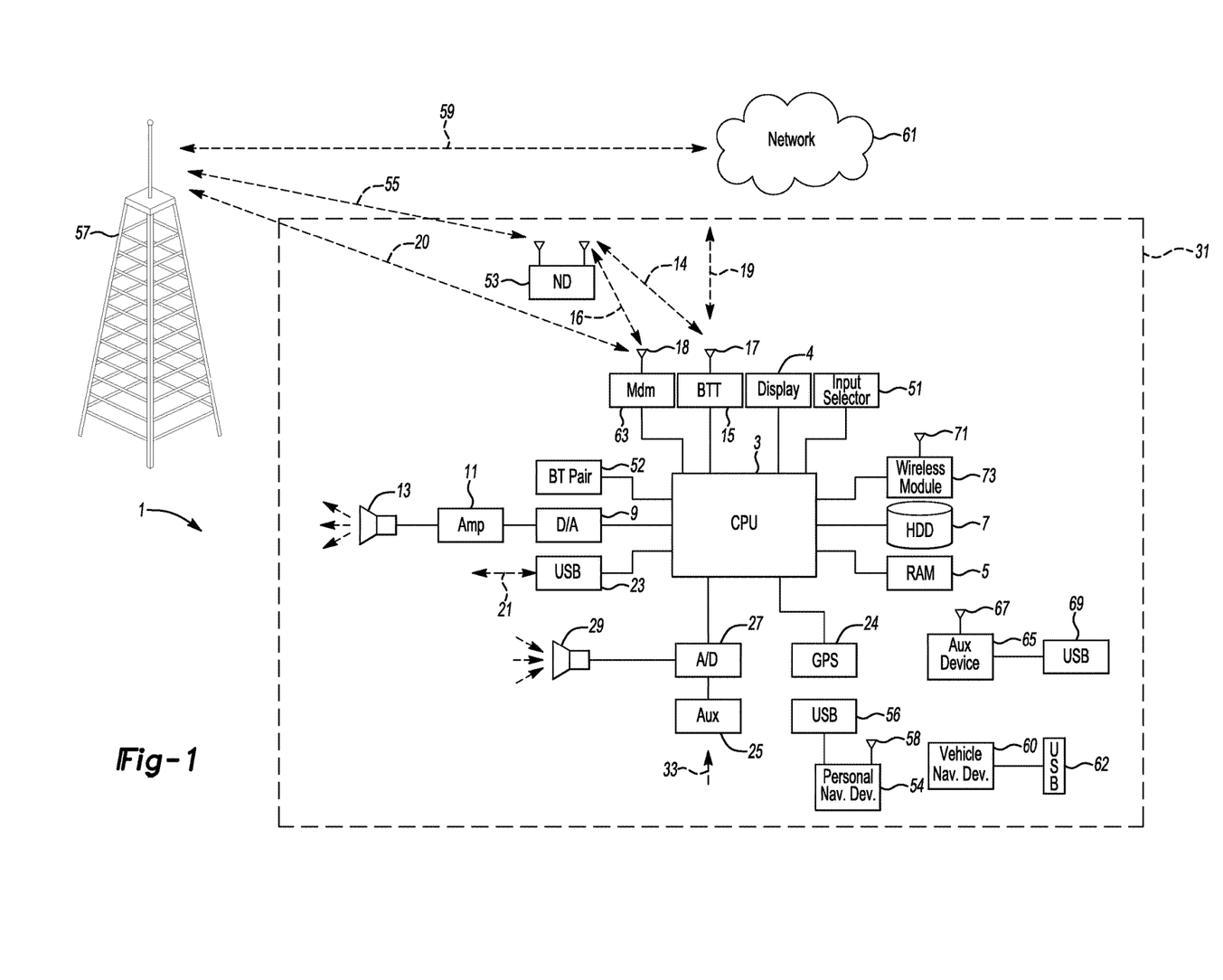
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connections. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

As previously noted, there are numerous current functions available for a vehicle infotainment system, but many more functions are additionally possible. In these illustrative embodiments, a system is contemplated whereby a user can input a shopping list for use by a vehicle computing system. Some illustrative examples of shopping list items could be recurring items, one time purchases, "wish list" purchase, etc. The list could also contain a form of user ranking, emphasizing priority to a user of a particular good or service. Additionally or alternatively, the user could enter time estimates, as to how long a particular good may take to select or purchase or how urgent a need is to obtain the good. These estimates can be used as seen later, in the illustrative embodiments.

The complexities of determining potential shopping destinations, given a variety of possible objects for purchase and a variety of places at which some or each of the items can be purchased, can range depending on how a provider wishes to optimize the equation. In a simple case, a nearest store with the most items could simply be selected, and given as an option. In a more complex case, the weighted importance of a variety of items can be considered, along with gas cost, drive time, number of items available at each store, proximity of stores with different items on a list, and the price difference of goods between stores including special offers, etc., can all be considered (along with any other relevant factors).

Figure 2:
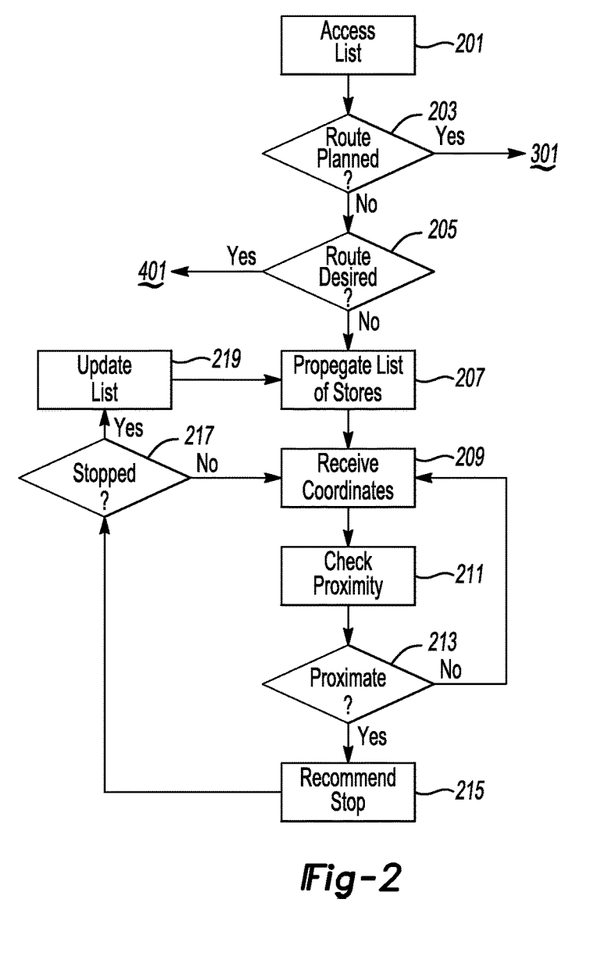
FIG. 2 shows an illustrative example of a stop recommendation process.

FIG. 2 shows an illustrative example of a route planning process. In this illustrative embodiment, a user may not have a particular route planned, but may have previously input one or more items desired for purchase. The input of the items can be done in numerous fashions, including, but not limited to, online, in-vehicle, verbally in-vehicle, through use of a smart phone or other wireless device, etc. In at least one example, items for sale online may have icons affiliated therewith that allow a user to select the icon to append the item to a user-associated shopping list.

In this example, the illustrative process accesses an existing shopping list 201. The process, in this example, is running on a remote computing system, although the process could also be run on a vehicle computing system, a wireless device, etc. In addition to accessing a shopping list, the process determines if a route has been previously planned for the vehicle 203. If a route already exists, the process will proceed to determine possible stopping points along the route, as discussed with reference to FIG. 3.

If a route does not already exist, the process will determine if a particular route is desired 205. In this example, a desired route corresponds to a desire to have a vehicle/system process plan a route based on a shopping list and factors considered. If a planned shopping route is not desired, the process may still provide one or more recommended stopping points along a journey, based on a user proximity to store which sell one or more items listed on a shopping list and deals offered.

In this illustrative example, if no particular route is desired, the process may take an existing shopping list and populate a list of stores based on the data contained in that shopping list. For example, the process may be running on a remote server and the remote server may also have access to one or more shopping databases. These databases may be provided by manufacturers, distributors, retailers, exist as a central repository, etc. The shopping list can be cross referenced against one or more of these information sources until a list of stores which are likely or known to sell one or more of the items on the shopping list are known 207. The remote process can then periodically or continually receive vehicle coordinates 209.

By using the vehicle coordinates, the process can check the proximity of the vehicle location for the existence of any of the particular stores 211. In at least one embodiment, the process may establish the present coordinates of all known relevant stores within a radial existence of a vehicle starting point, current point, within a proximate distance of a vehicle traveling direction, etc. Any suitable means of pre-determining the localized coordinates of relevant stores (i.e. stores that sell the desired product(s)), may be utilized if desired. In such an example, current vehicle coordinates can be compared against predetermined coordinates for a correlation or proximity determination. In another example, a given proximity, radius, area around the coordinates, etc. can be checked for the existence of any relevant stores once the coordinates are received.

If no relevant stores are proximate to the vehicle 213, the process may continue to receive coordinates of the vehicle as the vehicle travels. If any store is proximate to the vehicle 213, the process may recommend a stop 215. For example, if the process recognizes that a vehicle is proximate to a grocery stores, and milk and eggs are on the list of items to purchase, the process may recommend that the driver stop at the proximal grocery store 215. The recommendation could include, but is not limited to, the name of the store, the items projected to be available at the store, the estimated time of stopping at the store, a distance/time off-route to the store, and prices of the goods compared to other stores etc.

If the stop has been recommended and the vehicle stops at the store 217, the process may update a shopping list 219. In this illustrative example, the update list process includes asking a user which of the list items were purchased, if any. This can be in the form of direct user description of purchased items, or in the presentation of a list of needed items for user selection of purchased items. If the user selects one or more relevant items, or indicates the purchase of one or more items from the list, the process can update the list 219. After the vehicle resumes travel, the process continues to receive vehicle coordinates and check for proximate stores.

Figure 3:
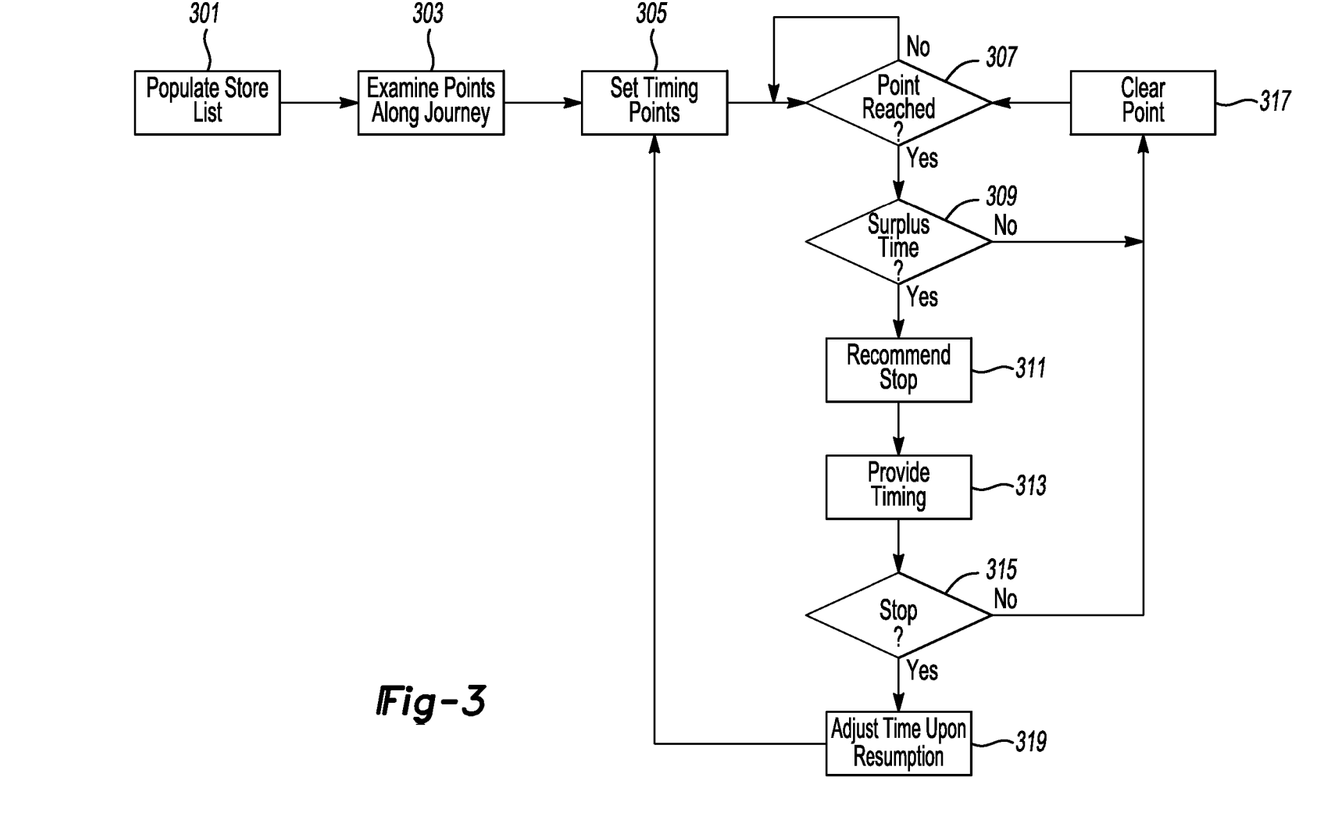
FIG. 3 shows an illustrative example of a second stop recommendation process

FIG. 3 shows an illustrative example of a process for checking for recommended stops along a known route. In this example, the process populates a list of stores along a known route. For example, if the route is known and a list of desired products is known, the process can check along the route, within, for example, a given proximity of the route, to determine if any stores exist along the route within the tolerable proximity.

In this illustrative example, the process will provide a user with a recommended stop if the estimated time of stop plus the estimated time remaining in a journey does not exceed a desired arrival time. For example, if a user needs milk and a milk stop will take an estimated 8 minutes, the process may first detect points along a route where milk can be obtained. Stopping points can be recommended and determined anywhere along a route, although in this example the points are set nearer to the end of the route. Setting a stopping point near the end of the route may allow both a driver and the system to determine how much surplus time remains. Surplus time, in this instance, is time remaining before the time a driver "needs" to be at a destination.

For example, if the driver has to be at work by 9:00 AM, and the driver leaves home at 8:00 AM, the driver may expect the drive to take approximately one hour with traffic and stops. But, if traffic is light, and the driver catches a lot of green lights, the drive may only take forty minutes. In this case, as the driver nears work, the system may recognize that twenty "free" minutes remain before the desired arrival time. Using this information, and the current location of the vehicle, the system can find a shopping stop that is proximate to the driver's position, will provide at least one item desired for purchase, and should take less time to purchase than the time remaining before the deadline. A quick stopping shop may only take fifteen minutes out of a route, and may allow a driver to purchase items desired and still make it to work on time.

The system may even be capable of determining between perishable and non-perishable items. For example, if a driver was on the way to work in the morning, the driver would not likely desire to purchase milk or other perishable goods.

In the illustrative example shown in FIG. 3, while the vehicle is in progress or before a route begins, the process populates a list of stores 301 which may sell items that the driver has input a desired for purchase. Additionally, the process may examine points along a journey where the route passes proximate to one or more of the stores populated in the list 303. These are likely to be the best stopping points along a route, and thus may correspond to the best times to determine if a surplus of time remains. Of course, time surplus determination may be made at any point along the route, in accordance with a desired scheme.

In this example, the process sets stopping points along a route 305. The stopping points are points along the route proximate to one or more stores which carry a good desired for purchase. They correspond, in this example, to points at which a time surplus will be checked against an estimated stop length. In certain embodiments, where time surplus is checked early in a route, it may be useful to add some additional amount of tolerance into the amount of time estimated to a complete a journey. Near the end of a route, traffic, lights and other obstacles to travel have all been successfully negotiated and thus will no longer impact the duration of a trip. If a user stops early on, however, due to an apparent surplus of time, and then encounters heavy traffic, the arrival deadline may be missed. Data pertaining to traffic, weather, lights, etc. can also be used to estimate the amount of time remaining in a journey. If sufficient time exists to travel to different stores, the process may recommend a store having the cheapest pricing.

The process continues monitoring the location of the vehicle until a designated stopping point has been reached 307. In this example the points correspond to geographic locations, but in another example the points could correspond to an estimated stop time. For example, if there were four possible detour shopping trips that existed near an end of a route, and each was estimated to take approximately fifteen minutes, once there were thirty minutes or fewer remaining before a deadline the process could begin to check to see where the vehicle was in relation to a destination; in other words, how much time is likely remaining. Whether a time or location based checkpoint is used, the process will, at some point, estimate if there is sufficient surplus time available to make a stop 309. In another example, where stop time is not known, the process may simply recommend stops if it recognizes that a predetermined amount of time remains before a deadline and a sufficient amount of the remaining time is not required to complete the travel.

If sufficient time remains, the process will recommend that the driver stop 311. The recommendation can include stop information 313 such as, but not limited to, stop duration, items available, name of store, option to route to/directions to store, multiple stop options, etc. The process may also include an option for a driver to indicate that a stop will be made. This can start a countdown clock in the vehicle, if desired, so that the driver knows how much time remains for the stop and then to return to the original route.

If a stop is made 315, in this embodiment, the process may either assume that a good was purchased or ask the driver if the good was purchased. Receiving information relating to goods that were purchased during a stop allows the driver to have an update processed on a shopping list. In this manner, the system avoids recommending stops for goods that were already purchased. In at least one embodiment, the process will inform the driver, at some point before the shopping detour is made, what goods are being purchased. If the driver has already purchased these goods on some other trip, for example, the driver can elect to have the previously purchased goods removed from the shopping list. This can help keep the shopping list updated without requiring the driver to constantly log-on and update the list online, for example.

If a stop is made, the process, upon resumption of a route, can update the time remaining before a deadline is reached 319. This helps the process track whether a second stop can be made, for example.

Figure 4:
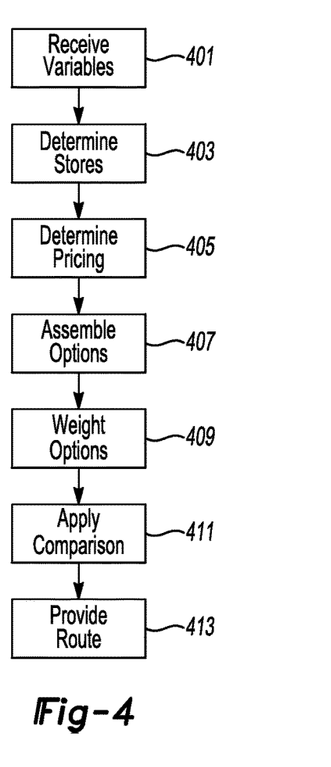
FIG. 4 shows an illustrative example of a route determination process.

FIG. 4 shows an illustrative example of a route planning process. In this illustrative example, a route may not have been specifically input by a user. Instead, a user may wish to have the process determine a route or routes based on a list of items the user wishes to purchase in conjunction with stores that are proximate to a user location. First, in this illustrative process, a list of variables to be considered is received 401. These can include, but are not limited to, items to be purchased, maximum distance to travel, maximum time to travel, weighted values of items, goals of a trip, items that are a "must purchase" on a given trip, a preferred direction in which to search for stores, etc.

Based on the variable(s) received, the process may determine one or more stores which supply the required items 403. For example, the process may do a radial search for stores, and then cross reference found stores with lists of items to determine the availability of items. In another example, the process may have a list of stores associated with each item, and search for instances of those stores proximate to a user position. Various methods of store selection are possible and contemplated to be within the scope of the illustrative embodiments.

In addition to determining which stores carry which items, the process may also determine pricing for the various items at each store 405. This can be done using, for example, a database, store websites, other online resources, or any suitable source for price information obtainment. After one or more stores are selected for at least one of the products on the shopping list, the process proceeds to assemble a list of possible shopping options 407. These options could be based on, for example, proximity within a maximum travel range. In another example, the process could simply expand a search range until at least X options existed, X being a predetermined or user-input number.

For example, a first store, AMart, may sell item1 for $3 and be 5 miles SE of a user ocation. A second store, BMart, may sell item1 for $3.50, item7 for $17 and be located 3.2 miles W of a user location. A third store, CMart, may sell item2 for $2, item4 for $11 and be located 11 miles N of a user location. The user may have input a maximum travel range of 15 miles, and a maximum trip time of 45 minutes. Examining the options, the computer could devise several suggested routes.

In this example, an Option A could include traveling 5 miles SE, buying item1, traveling to Bmart, buying item7 and returning home. An Option B could include traveling 3.2 miles W and purchasing item1 and item7 and returning home. An Option C could include traveling 11 miles N and purchasing item2 and item4 and returning home. An Option D could include traveling 3.2 miles W and purchasing item1 and item7, then traveling to CMart and purchasing item2 and item4 then returning home.

Once the possible trips have been assembled, the illustrative process proceeds to weight the various options based on user preferences. In the above example, the items could have differing levels of importance to a user, wherein obtainment of one item was more important than obtainment of another. For example, Item1 could have a weighted value of 0.5, item2 a value of 0.8, item4 a value of 1.1 and item7 a value of 1.3 (with a higher value corresponding to an item of more importance). In the examples above, Option A then has a value of 1.8 associated therewith, as does Option B (the value being the total aggregated value of the items obtainable). Option C has a value of 1.9 associated therewith, and option D has a value of 3.7. Option D, in this example, provides the highest option value route, but the process may have other considerations. For example, the price of goods may be a consideration that is undertaken. In this example, only one common item exists, and it is $0.50 cheaper at AMart than it is at BMart. But, given the cost of time and fuel (both possible real values the process con consider), it is likely that avoiding AMart altogether and simply purchasing item1 at BMart when item7 is also being purchased is the best plan. Thus, the process may rule out Option A.

On the other hand, if the price difference was, for example, $50, then it would probably be worth the addition cost of travel time and fuel. Any suitable variables and inputs may be used to determine a highest "value" route to a user. The route values may be determined using heuristic assumptions, a driver profile, associative rules, etc. The threshold for acceptance may then be set to include a manageable number of choices. The examples shown herein are for illustrative purposes only and are not intended to limit the scope of the invention in any manner.

Since Option A has been eliminated, Option D is clearly the preferable remaining option since it allows purchase of the maximum number of items. A user, however, already indicated that 45 minutes was a maximum shopping time. The process may evaluate option D and determine that it probably would take (including, if desired, traffic, lights, construction, weather, etc.) 8 minutes to travel to BMart, and then 17 minutes to travel to CMart and then 15 minutes to travel home. Additionally, the process may guess that each stop would likely take 15 minutes. Accordingly, the aggregated total time for Option D is 70 minutes, which is well over the allowable threshold.

In this embodiment, the route presented would be Option C, as it provides the highest weighted value, and fits within the entered constraints. In at least one embodiment, other routes, such as Option D, could be provided, with information informing the user about threshold exceeding, what will be obtained if the route is traveled, actual estimated time/ distance, etc. Once a suitable route is chosen, either by the process or by a user, if the user has an option to choose, the route is provided 413. In at least one embodiment, multiple, even sub-optimal routes, may be presented to the user for route selection. The user can pick which of the routes is desired, and the routes may be ordered, for example, by what the process determines is an optimal route. Additional details on each route may be provided or available, corresponding to, for example, without limitation, goods available on the route, pricing of goods, time of route, distance of route, estimated expenditure (including time/fuel, if desired), etc.

Figure 5:
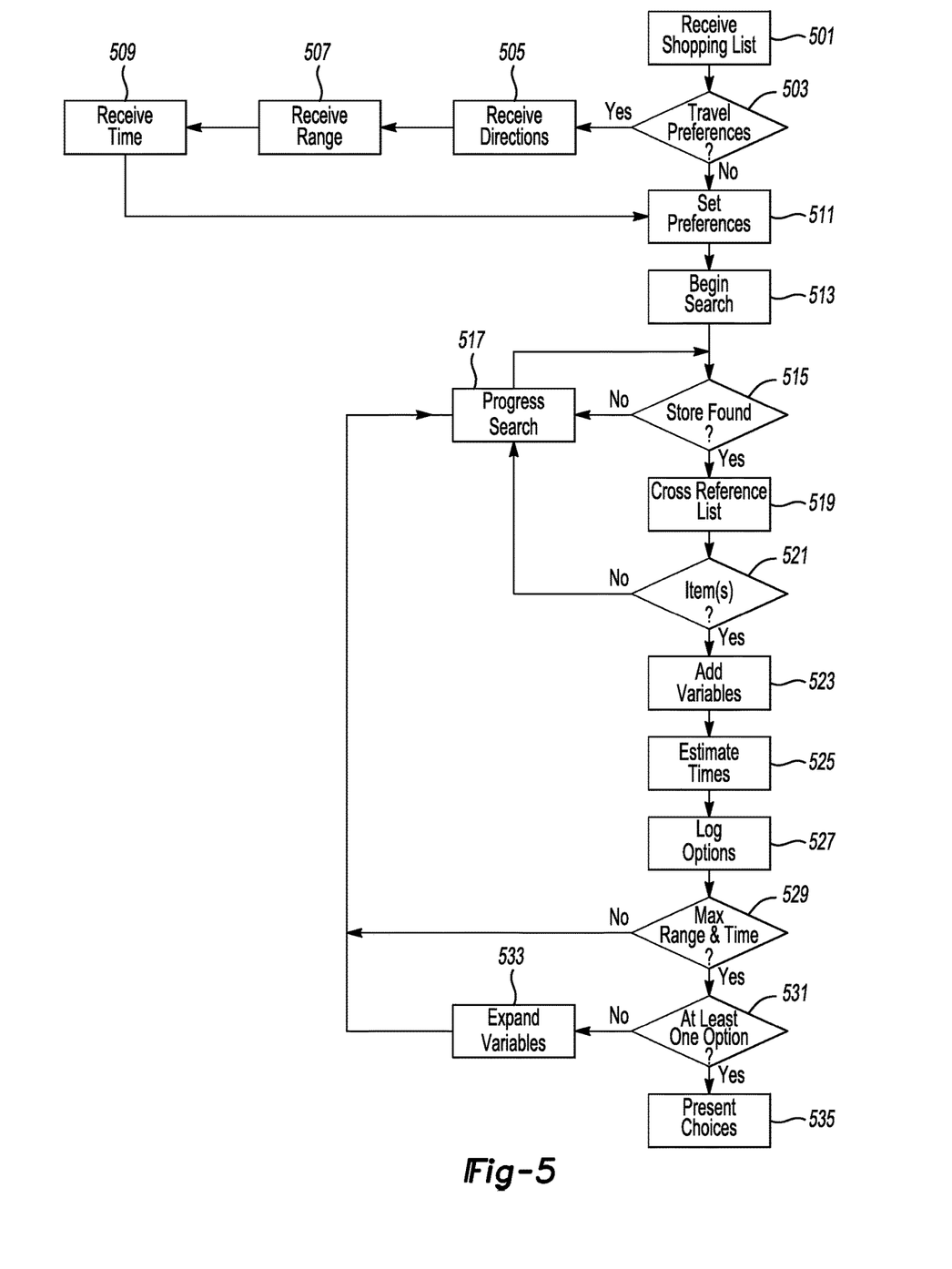
FIG. 5 shows an illustrative example of a second route determination process.

FIG. 5 shows another illustrative process for route selection. In this illustrative embodiment, a pre-populated (or populated at the time of route inception) shopping list is received by the process 501. The process then determines if the user has input or desires to input travel preferences 503.

If travel preferences are input, multiple preferences as appropriate can be input by the user. These can include, but are not limited to, direction of travel input 505, maximum range (or total distance there and back) 507, total time traveled (or total time to destination) 509, optimal/desired settings for the preceding (since the optimal may be less than the maximum), etc. These variables can help the process best select one or more routes and shopping options for presentation to a user.

Once elected travel preferences have been input (or not chosen), the process will set those and any additional preferences to be associated with a route 511. For example, other preferences can include, but are not limited to, minimum number/cost of goods (e.g., a user may not want to make a 20 minute trip just to buy lemonade), traffic related preferences (e.g., only areas of low/medium traffic), weather related preferences (only areas not under a thunderstorm), etc. These settings may also be predefined at some earlier point in time, in addition to being configurable at the time of route inception. A search, taking into consideration any relevant settings and/or preferences, can then be initiated 513.

In this illustrative embodiment, the process will hunt for any store 515. If found, the store will be cross referenced with the list of goods, to determine which goods may be for sale at the store 519. This cross referencing can be based on a definitive existence of goods (i.e., the process "knows" or reasonably is certain that a good is at the store), a likely existence of goods (i.e., the process "knows" the store sells groceries, so a particular grocery is likely to be there), or any other suitable means of comparison and determination. Definitive decision making can be based on a reference to a database, website, etc., listing goods available at a store. Likely "guess" decision making can be based on a type of store, as knowable from a database, previous experience, online information, etc. If no store is found (depending on how the search iterates, for example, it could first search within 0.1 miles and expand the search by a reasonable amount each time) the process continues searching for a store.

If one or more items is available, likely to be available, etc. 521, the process will add in any relevant variables to the item 523. These can include, but are not limited to, distance to travel, time to purchase, cost of item, time to travel, weighted value of item, etc. Total travel time, time to store+time to shop, or any other relevant time can then be estimated 525. Any options for purchasing the item can then be logged 527 in, for example, a list that will be used to populate possible routes 527.

The process checks to see if a max time and/or range has yet been met 529. If the maximum time or range (or other end-condition) has not been met, the process will continue looking for other stores in the hopes of expanding routing possibilities. If the maximum time/range has been met, the process checks to see if at least one suitable option for travel/shopping exists 531. If there is not at least one option, in this embodiment, the process expands at least one maximum variable and continues the search 533. If there is at least one option, the process presents the possible options to a user for route selection (or presents the optimally selected route, etc.).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
responsive to receipt of an occupant-defined shopping list, determining stores selling an item from the list that are also reachable by a trip conforming to an occupant-defined parameter;
upon finding a plurality of stores, each selling a list item, assembling a plurality of trips conforming to the parameter, using a vehicle computer;
determining an optimal trip of the plurality of trips, based on an occupant-defined prioritization weighting defining relative importance between different list items, such that the optimal trip includes the highest aggregate of weighted values of items obtainable by visiting stores on the optimal trip; and
recommending the optimal trip.

2. The method of claim 1, wherein the trip parameter includes a maximum range.

3. The method of claim 1, wherein the trip parameter includes a maximum total distance traveled.

4. The method of claim 1, wherein the trip parameter includes a maximum trip time.

\* \* \* \* \*